United States Patent Office 3,736,255
Patented May 29, 1973

3,736,255
WATER DECOLORIZATION
Masood Ghassemi, Canoga Park, Howard L. Recht, Northridge, and Eugene V. Kleber, Woodland Hills, Calif., assignors to North American Rockwell Corporation
No Drawing. Filed Oct. 1, 1970, Ser. No. 77,391
Int. Cl. C02c 5/02
U.S. Cl. 210—45
15 Claims

ABSTRACT OF THE DISCLOSURE

A method is provided for chemically removing coloring matter from water by treating the coloring matter-containing water with a trivalent rare earth salt, generally as a mixture of such salts, to form an insoluble rare earth precipitate and then separating the precipitate from the water. The rare earth precipitant salt, such as lanthanum chloride or lanthanum sulfate, may be regenerated by first heating the rare earth precipitate to form rare earth oxides and to drive off the organic components by converting them to carbon dioxide and water. The rare earth oxide may be used directly in acidic waters or converted to a soluble rare earth salt by using acid such as dilute hydrochloric or sulfuric acid.

BACKGROUND OF THE INVENTION

This invention relates to a method for the chemical removal of coloring matter from water. It particularly relates to a method wherein coloring matter in water is treated with trivalent rare earth ions to form an insoluble rare earth precipitate containing the coloring matter.

Coloring matter is found in the effluent from many industrial sources and is present in most natural waters. The coloring matter is typically organic and may be either natural or synthetic in origin.

Pulp and paper mills, tanneries and textile mills are illustrative of the industrial sources which produce a substantially colored effluent. The color of this effluent is derived primarily from colored lignins, tannins or flavanoids.

With respect to the pulp and paper industry, the sulfite and kraft processes are the two most important chemical pulping processes. In the sulfite process, the wood lignin is made soluble by sulfonation and the soluble lignosulfonates, sugars and some extraneous materials are dissolved in the cooking liquor which is separated from the cellulose pulp. This acid sulfite waste is a dark brown-color liquor having a pH of about 2 to 4 when it is discharged from the pulp mill. In the kraft process, a mixture of sodium sulfide and sodium hydroxide is used to remove sufficient lignin to permit fiber separation.

To obtain a high brightness pulp, the raw fibers produced during the pulping operation are frequently subjected to a bleaching operation. Chlorine is typically used for this operation. Two wastes of dissimilar reaction are produced by the bleaching operation. An acid bleach waste results from the chlorine and hypochlorite stages and, in the case of kraft waste, an alkaline bleach waste results from a caustic extraction stage.

Aluminum and iron coagulants such as aluminum sulfate and ferric chloride, respectively, have been used to decolorize pulping waters. Additionally, a "massive lime treatment" process has been developed for decolorizing caustic bleach waste liquors (U.S. Pat. 3,120,464). Activated carbon adsorption has also been employed for decolorization of various kraft effluents.

SUMMARY OF THE INVENTION

It is an object of the present invention to provide an efficient method for the direct precipitation of coloring matter from water using a trivalent rare earth salt.

It is a further object to provide a method for removing natural and/or synthetic colored bodies from both natural and man-made waters.

Further objects and advantages will become apparent upon reading the undergoing specification and claims.

A water decolorization method is provided in which coloring matter is removed from a colored water by precipitating the coloring matter in the water with a trivalent rare earth salt, generally as a mixture of such salts. The trivalent rare earth salt is preferably a lanthanum salt such as lanthanum chloride, lanthanum sulfate or lanthanum hydroxide in admixture with other trivalent rare earth salts. The rare earth ions combine with the coloring matter to form an insoluble rare earth precipitate containing the coloring matter which is removed from the water, preferably by settling and/or filtration.

Effluents treated in accordance with the present method may include the waste waters from pulp and paper mills, tanneries and textile mills. Both of the two most important chemical pulping processes, namely, the sulfite and kraft processes produce colored effluents which can be decolorized by the present method. The present trivalent rare earth ion precipitation method may be used in decolorizing the alkaline bleach waste and the acid bleach waste in the kraft process as well as the main kraft bleach waste which includes both the alkaline and acid bleach wastes. In these effluents, the rare earth ions react with colored lignins, tannins and flavanoids and other colored bodies to form an insoluble rare earth precipitate containing the colored bodies.

Conventional calcium, iron, aluminum and polyelectrolyte coagulants may be used in combination with the present trivalent rare earth ions in the removal of coloring matter from water. For example lime (CaO), usually in a quantity considerably less than is employed in the "massive lime treatment" process, improves the settling characteristics of the flocs which form during coloring matter precipitation and improves the compaction and dewater ability of the rare earth precipitates. When lime is used, it can act to precipitate residual unprecipitated trivalent rare earth ion as the hydroxide.

The rare earth precipitant salt, such as lanthanum chloride or lanthanum sulfate, may be regenerated by first heating the rare earth precipitate to form rare earth oxides and to drive off the organic components by converting them to carbon dioxide and water. The rare earth oxide may be used directly in acidic waters or converted to a soluble rare earth salt by using acid such as dilute hydrochloric or sulfuric acid. If excess rare earth precipitant is used, residual unprecipitated trivalent rare earth ion may be precipitated as the hydroxide by the addition of lime or as the carbonate by the addition of carbonate ion, generally provided by an alkali metal carbonate. The insoluble rare earth carbonate precipitate may be converted to a soluble rare earth salt by using acid such as dilute hydrochloric or sulfuric acid.

DESCRIPTION OF THE PREFERRED EMBODIMENTS

The present invention is broadly directed to a process for chemically removing coloring matter from water by directly precipitating the coloring matter in the water by treating the water with trivalent rare earth ion, generally provided by a mixture of rare earth salts, to form an insoluble precipitate containing the coloring matter and then separating this precipitate from the water. This precipitate may be regeneratively heated to form rare earth oxides and to drive off the organic components. The rare earth oxide can be used directly in acidic waters or converted to a soluble rare earth salt such as lanthanum chloride or lanthanum sulfate by using acid such as dilute hydrochloric or sulfuric acid.

In the regeneration step, the insoluble rare earth precipitate is heated by conventional technique in a kiln or other furnace in the presence of oxygen to drive off the organic components of the coloring matter contained in the precipitate by converting them to carbon dioxide and water. The rare earth component of the precipitate is converted to rare earth oxide during this regenerative heating step. The ash which remains after the carbon dioxide, water and volatile organics are driven off is dissolved in acid such as dilute hydrochloric or sulfuric acid to convert the rare earth oxide to a soluble rare earth salt such as lanthanum chloride or lanthanum sulfate which can be used directly for further coloring matter precipitation. When trivalent rare earth cation is being used for removing coloring matter from the effluent from pulping mills which employ a bleaching operation, the ash from the regenerative heating step can conveniently be dissolved in the acid waste from the bleaching operation to reconstitute soluble rare earth precipitant.

Although, for the purpose of illustration, the invention will be described with respect to the removal of colored lignins, tannins and flavanoids and other colored bodies from the effluent from pulp and paper mills, tanneries and textile mills, it should be understood that the process is applicable to the removal of coloring matter in general. As stated previously, coloring matter found in natural waters and industrial effluents is typically organic and may be either natural or synthetic in origin. Additionally, it should be understood that while the invention will be described with respect to several industrial effluents, it is applicable to the decolorization of any water including natural waters which have been contaminated with natural and/or synthetic colored bodies. These colored waters can generically be considered to be "waste water."

A lanthanum salt such as lanthanum chloride, sulfate or hydroxide is preferred as the source of the trivalent rare earth ions. Under actual operating conditions, it will be most convenient and economical to use a rare earth mixture containing lanthanum in admixture with other rare earth elements rather than any pure rare earth salt itself. The mixture of rare earth salts can be obtained from a lanthanum-containing mineral source such as monazite, bastnasite and mineral tailings obtained in the processing of uranium-containing mineral ores. Lanthanum constitutes about 23 percent of the cation contents of monazite. Bastnasite, which contains more than 30 cation percent lanthanum, is readily available commercially in unleached, leached or calcined form. It should be understood, however, that lanthanum salts, while being generally preferred, are merely exemplary of trivalent rare earth salts in general, any of which can be used alone or as a mixture of rare earth salts.

The term "rare earth" as used herein is intended to refer to the lanthanide series of elements, atomic numbers 57–71, and to include yttrium, atomic number 39, which has properties similar to the rare earths and occurs in nature together with the rare earths. The so-called light rare earths, the cerium group (atomic numbers 57–63), because of their basicity are generally preferred as precipitants to the so-called heavy rare earths, the yttrium group (atomic numbers 64–71).

The trivalent rare earth precipitant, preferably lanthanum ion in admixture with other trivalent rare earth ions, may conveniently be employed in the form of its chloride, nitrate hydroxide or sulfate. While lanthanum hydroxide is relatively insoluble compared with lanthanum chloride or sulfate, it is particularly suitable for use in treating waters that are acidic. For treating non-acidic waters, the chloride salt is preferred.

The decolorization of waste water by the process of the present invention can be practiced over a broad pH range. The pH range preferred for any given waste water will depend on the type of effluent being treated and on the type of colored bodies being removed. It is generally preferred to operate at a pH of about 3 to 14. With respect to kraft pulping waste, it is generally preferred to treat the alkaline bleach waste at a pH of about 5 to 8 and the acid bleach waste at a pH of about 8 to 14. With respect to the acid sulfite pulping process, a pH of about 5 to 9 is generally preferred for treating the waste effluent.

The quantity of trivalent rare earth ion which will be required to decolorize a given water will depend, among other things, on the type and concentration of coloring matter present. The quantity of precipitant used will also depend on the degree of decolorization desired or required according to local water regulation standards. The quantity of precipitant required to decolorize a given colored water may be determined experimentally by treating samples of the water with varying quantities of the precipitant and selecting the dosage which yields the desired degree of decolorization.

Any residual unprecipitated trivalent rare earth ion can be precipitated as the hydroxide by the addition of lime or the rare earth ion may be precipitated in accordance with the process set forth in a commonly assigned application, S.N. 77,390, filed Oct. 1, 1970, for "Rare Earth Ion Removal from Waste Water" by Howard L. Recht et al., now U.S. Pat. No. 3,692,671. In this commonly assigned application, a process is disclosed for chemically removing unreacted excess trivalent rare earth ions from water by directly precipitating the ions in the water by reaction with a carbonate ion, generally provided by an alkali metal carbonate, to form an insoluble rare earth carbonate precipitate and then separating the precipitate from the water. The rare earth carbonate precipitate may be dissolved in acid such as dilute hydrochloric or sulfuric acid to regenerate the rare earth precipitant. The carbonate precipitant can be a carbonate or bicarbonate salt and, if desired, the bicarbonate anion can be generated in situ by adding carbon dioxide to a water with a pH above about 6. The carbonate precipitant can be added to the water either prior to, at the same time or after the addition of the rare earth precipitant to the colored waters. The excess trivalent rare earth ion is preferably removed at a pH of from about 7 to 8.

Lime has been found to aid trivalent rare earth ions in the removal of coloring matter from waste water. The lime results in improved settling characteristics of the flocs which form during coloring matter precipitation and results in improved compaction and dewaterability of the rare earth precipitates. The lime can be added to the colored waste waters either before, after or at the same time that the rare earth precipitant is added. The quantity of lime added to the colored waters is usually considerably less than is employed in the "massive lime treatment" process (U.S. Pat. 3,120,464). In the case of acidic waters, lime is particularly useful in raising the pH of the acid wastes which generally makes the trivalent rare earth precipitant more effective. In addition to lime or other calcium (II) coagulants, conventional iron (III), aluminum (III) and polyelectrolyte coagulants may be used in conjunction with rare earth precipitants to effect color removal and improve the characteristics of the precipitates.

The following non-limiting examples illustrate the invention.

EXAMPLE 1

A two-gallon sample of alkaline bleach waste from a kraft pulping mill was diluted 6 to 1 (6 parts diluent to 1 part alkaline bleach waste) with distilled water. Five hundred milliliters of the diluted waste were placed in a one-liter beaker which was then placed in a stirring apparatus. While stirring at 90 r.p.m., 10 milliliters of a 0.05 M lanthanum nitrate [$La(NO_3)_3$] solution were added to the beaker. An automatic titrator was used to maintain the pH at 6 by the addition of dilute sodium hydroxide or hydrochloric acid. After 2 minutes of stirring at 90 r.p.m., the stirring rate was slowed to 20 r.p.m. and the stirring was continued at this rate for 10 minutes. After the stirring was completed, 20 minutes of quiescent settling was allowed after which a portion of the supernatant was removed for turbidity analysis. The turbidity analysis was conducted on a standard turbidiometer calibrated to read in Jackson Turbidity Units (JTU) [see Standard Methods for the Examination of Water and Wastewater, 12th ed., Amer. Pub. Health Assn. (New York, 1965), p. 312 et. seq.]. The supernatant was filtered through Whatman No. 42 filter paper and the color of the filtrate was determined at a wavelength of 420 m$\mu$ using a Lumetron Colorimeter (Model 402E) (Photovolt Corporation, New York, N.Y.). The residual turbidity of the supernatant following 20 minutes of quiescent settling was 1.6 JTU. The optical density of the supernatant after filtration was 0.24 which represented a 92 percent reduction in color based on the optical density of the original diluted sample of alkaline bleach waste.

EXAMPLE 2

Diluted alkaline bleach waste from the two-gallon sample in Example 1 was treated in accordance with the procedure of Example 1 except that the automatic titrator was used to maintain the pH at 4. The residual turbidity of the supernatant following 20 minutes of quiescent settling was 4.2 JTU. The optical density of the supernatant after filtration was 0.46 which represented an 84 percent reduction in color based on the optical density of the original diluted sample of alkaline bleach waste.

EXAMPLE 3

Eight (8) milliliters of a 0.1 M lanthanum nitrate [$La(NO_3)_3$] solution were added to a 250-milliliter sample of alkaline bleach waste from a kraft pulping mill which had a color at pH 6.2 of 7,600 platinum-cobalt (Pt-Co) units (see Standard Methods, supra, p. 127 et. seq.). The sample was placed in a stirring apparatus and stirred rapidly at 90 r.p.m. for 2 minutes. The stirring rate was then reduced to 20 r.p.m. and the stirring was continued at this rate for an additional 10 minutes. After the stirring was completed, the pH of the sample, which was 6.3, was measured and the sample was allowed to settle for 20 minutes. Following the 20 minute period of quiescent settling, the supernatant was filtered through Whatman No. 40 filter paper and the color of the filtrate was determined at a wavelength of 420 m$\mu$ using a Lumetron Colorimeter (Model 402E) which had been calibrated against platinum-cobalt color standards. The color of the supernatant at a pH of 6.7 after filtration was 410 platinum-cobalt units which represented a 94 percent reduction in color.

EXAMPLE 4

A 250-milliliter sample of the same alkaline bleach waste used in Example 3 was treated in accordance with the procedure of Example 3 except that 15 milliliters of 0.1 M lanthanum nitrate [$La(NO_3)_3$] solution were added to the sample. The pH of the supernatant after filtration was 5.9. The color of the supernatant after filtration was 232 platinum-cobalt units at an adjusted pH of 6.4 which represented a 97 percent reduction in color.

EXAMPLE 5

A sample of main Kraft bleach wastewater which is a combination of alkaline and acid bleach waste from the Kraft process as well as the waste from other residual streams was treated with lanthanum nitrate [$La(NO_3)_3$] until the sample was $7.5 \times 10^{-4}$ molar. The sample was then treated as described in Example 3 except that, after the 20 minute period of quiescent settling, a portion of the supernatant was removed for turbidity analysis. The turbidity of the sample before lanthanum nitrate treatment but after filtration through a Sargent No. 500 filter paper was 13 JTU and the color was 3170 platinum-cobalt units at pH 7. The residual turbidity of the unfiltered supernatant was 2.1 JTU. The color of the supernatant after filtration was 177 platinum-cobalt units which represented a 94.4 percent reduction in color.

EXAMPLE 6

A sample of acid sulfite pulping wastewater from an acid sulfite pulping mill was filtered through Whatman No. 2 filter paper and diluted 20 to 1 (20 parts diluent to 1 part acid sulfite waste) with distilled water. The diluted sample had a color of 33,000 platinum-cobalt units at pH 2.5. The sample was treated with lanthanum nitrate [$La(NO_3)_3$] until is was $7.5 \times 10^{-3}$ molar. The sample was then treated as described in Example 3 except that sodium bicarbonate was added to the solution after the period of quiescent settling until a pH greater than about 6 was reached to precipitate excess lanthanum as lanthanum carbonate [$La_2(CO_3)_3$]. The color of the supernatant after filtration was measured at an adjusted pH of 2.5. The color measured 6,930 platinum-cobalt units which represented a 78.7 percent reduction in color.

EXAMPLE 7

A sample of tannery dye waste, yellow-orange in color, was filtered through Whatman No. 42 filter paper, diluted with distilled water, adjusted to pH 7.0 and the color determined at a wavelength of 620 m$\mu$ using a Lumetron Colorimeter (Model 402E). To 50 milliliters of the filtered tannery dye waste, adjusted to pH 7.0, were added 4 milliliters of 0.5 M lanthanum nitrate [$La(NO_3)_3$] solution. The sample was stirred rapidly for 2 minutes, the pH adjusted to 7.0, stirred rapidly for an additional 2 minutes, and slowly for an additional 10 minutes. Following 10 minutes of quiescent settling, the supernatant was filtered through Whatman No. 42 filter paper, diluted with distilled water 5 to 1 (5 parts diluent to 1 part supernatant), and the color determined at a davelength of 620 m$\mu$. The lanthanum nitrate treatment was found to result in a 96.4 percent reduction in color.

EXAMPLE 8

To 50 milliliters of filtered textile dye waste, adjusted to pH 7 were added 5 milliliters of 0.05 M lanthanum nitrate [$La(NO_3)_3$] solution. The sample was stirred rapidly for 2 minutes and then slowly for 10 minutes. Following 10 minutes of quiescent settling, the supernatant was filtered through Whatman No. 40 filter paper, diluted 5 to 1 (5 parts diluent to 1 part supernatant) and adjusted to a pH of 7. The lanthanum nitrate treatment was found to result in a 92.5 percent reduction in color based on the color of the original sample of textile dye waste.

EXAMPLE 9

A 50-milliliter sample of the same textile dye waste used in Example 8 was treated in accordance with the procedure of Example 8 except that 2 milliliters of 0.05 M lanthanum nitrate [$La(NO_3)_3$] solution were added to the sample. The lanthanum nitrate treatment was found to result in an 89 percent reduction in color based on the color of the original sample of textile dye waste.

We claim:

1. A metod for decolorizing an organic coloring matter-containing water by chemically removing the organic matter present therein which includes the steps for direct removal of said organic coloring matter consisting essentially of treating said water with a trivalent rare earth cation in soluble form to form in said water an insoluble precipitate of said trivalent rare earth cation and said organic coloring matter, and separating said precipitate from said water.

2. The method of claim 1 in which the rare earth precipitant used to form the rare earth precipitate principally contains lanthanum as the chloride, sulfate, or nitrate, or as the hydroxide in acid waste water.

3. The method of claim 1 in which the rare earth precipitant is a mixture of rare earth salts obtained from a lanthanum-containing mineral source.

4. The method of claim 1 including the further steps of separately recovering said insoluble precipitate and then heating said precipitate in the presence of a source of oxygen to decompose it to form a gaseous product and a recoverable rare earth oxide.

5. The method of claim 4 in which the rare earth oxide is treated with an acid to convert said rare earth oxide to a soluble rare earth salt.

6. The method of claim 5 in which the acid is hydrochloric acid or sulfuric acid.

7. The method of claim 1 in which the water is treated with the trivalent rare earth cation at a pH of about 3 to 14.

8. The method of claim 1 in which a calcium, iron, aluminum or polyelectrolyte coagulant is added to the water to aid in the removal of coloring matter.

9. A method for decolorizing an organic coloring matter-containing industrial waste water by chemically removing the organic coloring matter present therein comprising treating said water with a lanthanum cation in soluble form at a pH of about 3 to 14 to form in said water an insoluble precipitate of said lanthanum cation and said organic coloring matter and separating said precipitate from said water.

10. The method of claim 9 in which the waste water is from a kraft pulping mill.

11. The method of claim 10 in which the waste water from the kraft pulping mill is alkaline bleach waste.

12. The method of claim 10 in which the waste water from the kraft pulping mill is acid bleach waste.

13. The method of claim 9 in which the waste water is from an acid sulfite pulping mill.

14. The method of claim 9 in which the waste water is from a tannery.

15. The method of claim 9 in which the waste water is from a textile mill.

References Cited
UNITED STATES PATENTS

| | | | |
|---|---|---|---|
| 2,872,286 | 2/1959 | Finzel | 210—42 X |
| 3,259,568 | 7/1966 | Jordan et al. | 210—42 X |
| 3,300,406 | 1/1967 | Pollio | 210—52 |
| 3,617,569 | 11/1971 | Daniels et al. | 210—53 |
| 3,484,837 | 12/1969 | Odom et al. | 210—52 |
| 3,377,271 | 4/1968 | Cann | 210—47 X |
| 3,578,587 | 5/1971 | Kemmer | 210—52 |

MICHAEL ROGERS, Primary Examiner

U.S. Cl. X.R.

162—29; 210—52; 423—263